United States Patent
Buff et al.

(10) Patent No.: US 9,411,121 B2
(45) Date of Patent: Aug. 9, 2016

(54) PORT TAP CABLE HAVING IN-LINE FURCATION FOR PROVIDING LIVE OPTICAL CONNECTIONS AND TAP OPTICAL CONNECTION IN A FIBER OPTIC NETWORK, AND RELATED SYSTEMS, COMPONENTS, AND METHODS

(71) Applicant: Corning Cable Systems LLC, Hickory, NC (US)

(72) Inventors: Scott Eaker Buff, Hickory, NC (US); Terry Lee Cooke, Hickory, NC (US); Christopher Shawn Houser, Newton, NC (US); Ronald Alan Leonard, Connelly Springs, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 252 days.

(21) Appl. No.: 13/940,437

(22) Filed: Jul. 12, 2013

(65) Prior Publication Data
US 2015/0016788 A1 Jan. 15, 2015

(51) Int. Cl.
*G02B 6/44* (2006.01)
*G02B 6/28* (2006.01)

(52) U.S. Cl.
CPC ............ *G02B 6/4472* (2013.01); *G02B 6/4475* (2013.01); *G02B 6/2817* (2013.01); *G02B 6/4479* (2013.01); *Y10T 29/49826* (2015.01)

(58) Field of Classification Search
CPC ... G02B 6/2817; G02B 6/4479; G02B 6/4475
USPC .............................................. 385/15, 31, 50
See application file for complete search history.

(56) References Cited

U.S. PATENT DOCUMENTS

| | | | | |
|---|---|---|---|---|
| 6,909,828 B2 * | 6/2005 | Zimmel | ............... | G02B 6/4476 385/100 |
| 7,016,592 B2 * | 3/2006 | Elkins, II | ............. | G02B 6/4472 385/100 |
| 7,277,614 B2 * | 10/2007 | Cody | ................... | G02B 6/3807 385/100 |
| 7,409,127 B1 * | 8/2008 | Hurley | ................. | G02B 6/3817 385/101 |
| 7,542,681 B2 * | 6/2009 | Cornell | ............... | G02B 6/2804 398/135 |
| 7,753,596 B2 * | 7/2010 | Cox | ...................... | G02B 6/4466 385/135 |

(Continued)

FOREIGN PATENT DOCUMENTS

| | | | | |
|---|---|---|---|---|
| DE | 19751557 A1 | 6/1999 | ............... | G02B 6/24 |
| WO | WO 2013/043235 A2 | 3/2013 | ............... | G02B 6/04 |

OTHER PUBLICATIONS

Patent Cooperation Treaty International Search Report, Application No. PCT/US2014/045643, Sep. 22, 2014, 4 pages.

*Primary Examiner* — Ryan Lepisto
*Assistant Examiner* — Guy Anderson

(57) ABSTRACT

A port tap cable for supporting live optical connections in a fiber optic network includes one or more fiber optic splitters, which each receive an optical signal from a live input optical fiber of a live input fiber optic cable leg. Each fiber optic splitter splits each optical signal and transmits the signal to a live output optical fiber of a live output fiber optic cable leg and a tap output optical fiber of a tap output fiber optic cable leg. The one or more splitters are enclosed in a furcation, thereby forming a port tap cable that allows for monitoring of optical signals within an active fiber optic network without the need for interrupting network operations. This arrangement also allows for monitoring individual ports in an existing network installation.

23 Claims, 10 Drawing Sheets

(56) References Cited

U.S. PATENT DOCUMENTS

| | | | | |
|---|---|---|---|---|
| 9,025,960 B2 * | 5/2015 | Fang | | H04L 65/1073 370/252 |
| 9,091,835 B2 * | 7/2015 | Cunningham | | G02B 6/4471 |
| 2005/0011800 A1 * | 1/2005 | Messinger | | B65D 5/0236 206/521 |
| 2005/0053341 A1 * | 3/2005 | Zimmel | | G02B 6/4453 385/111 |
| 2006/0269208 A1 | 11/2006 | Allen et al. | | 385/135 |
| 2007/0212072 A1 * | 9/2007 | Iannone | | H04J 14/0226 398/72 |
| 2009/0202205 A1 * | 8/2009 | Conner | | G02B 6/4201 385/48 |
| 2010/0092129 A1 | 4/2010 | Conner | | 385/17 |
| 2010/0150504 A1 * | 6/2010 | Allen | | G02B 6/4475 385/76 |
| 2010/0202740 A1 * | 8/2010 | Barlowe | | G02B 6/4471 385/100 |
| 2010/0303431 A1 | 12/2010 | Cox et al. | | 385/135 |
| 2010/0322554 A1 * | 12/2010 | Barnes | | G02B 6/0365 385/24 |
| 2010/0322583 A1 * | 12/2010 | Cooke | | G02B 6/4452 385/135 |
| 2012/0027361 A1 * | 2/2012 | Brower | | G02B 6/4471 385/89 |
| 2013/0004122 A1 * | 1/2013 | Kingsbury | | G02B 6/4471 385/31 |
| 2013/0308915 A1 * | 11/2013 | Buff | | G02B 6/4452 385/135 |
| 2013/0308916 A1 * | 11/2013 | Buff | | G02B 6/4452 385/135 |

* cited by examiner

PORT TAP CABLE HAVING IN-LINE FURCATION FOR PROVIDING LIVE OPTICAL CONNECTIONS AND TAP OPTICAL CONNECTION IN A FIBER OPTIC NETWORK, AND RELATED SYSTEMS, COMPONENTS, AND METHODS

BACKGROUND

The disclosure relates generally to providing fiber optic connections in fiber optic equipment, and more particularly to port tap fiber optic cables, which may be used to support both live fiber optic connections and tap connections for monitoring the live fiber optic connections in fiber optic networks.

Benefits of utilizing optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed for use in delivering voice, video, and data transmissions to subscribers over both private and public networks. These fiber optic networks often include separated connection points linking optical fibers to provide "live fiber" from one connection point to another. In this regard, fiber optic equipment is located in data distribution centers or central offices to support live fiber interconnections. For example, the fiber optic equipment can support interconnections between servers, storage area networks (SANs), and/or other equipment at data centers. Interconnections may be further supported by fiber optic patch panels or modules.

Fiber optic equipment is customized based on application and connection bandwidth needs. The fiber optic equipment is typically included in housings that are mounted in equipment racks to optimize use of space. Many data center operators or network providers also wish to monitor traffic in their networks. Monitoring devices typically monitor data traffic for security threats, performance issues and transmission optimization, for example. Typical users for monitoring technology are highly regulated industries like financial, healthcare or other industries that wish to monitor data traffic for archival records, security purposes, and the like. Thus, monitoring devices allow analysis of network traffic and can use different architectures, including an active architecture such as SPAN (i.e., mirroring) ports, or passive architectures such as port taps. Passive port taps in particular have the advantage of not altering the time relationships of frames, grooming data, or filtering out physical layer packets with errors, and are not dependent on network load.

However, some port tap solutions require a large equipment footprint and may be customized to integrate into specific types of fiber optic networks. For example, structured cabling solutions that employ fiber optic modules may include specialized port tap modules that occupy rack space and are not easily integrated into other types of fiber optic networks. Accordingly, there is a need for a port tap solution that provides more universal compatibility and a smaller footprint.

No admission is made that any reference cited herein constitutes prior art. Applicant expressly reserves the right to challenge the accuracy and pertinence of any cited documents.

SUMMARY

Embodiments include a port tap cable for supporting live optical connections and tap connections in a fiber optic network. A furcation is provided in-line with the port tap cable and encloses one or more fiber optic splitters. For example, the furcation may be provided as a furcation plug, a shrink wrap connection, or other connection. A live input fiber optic cable leg having one or more input optical fibers is optically connected to the furcation, with each live input optical fiber optically connected to a live input of a corresponding fiber optic splitter. A live output fiber optic cable leg having one or more live output optical fibers is optically connected to the furcation, with each live output optical fiber optically connected to a live output of a corresponding fiber optic splitter to pass the live optical signal. Further, a tap output fiber optic cable leg having one or more tap output optical fibers is optically connected to the furcation, with each tap output optical fiber optically connected to a tap output of a corresponding fiber optic splitter to pass part of the live optical signal to the tap connection as a tap optical signal. This arrangement allows for monitoring of optical signals within an active fiber optic network without the need for interrupting network operations. This arrangement also allows for monitoring individual ports in an existing network installation.

One embodiment of the disclosure relates to a port tap cable for supporting at least one live optical connection and at least one tap optical connection in a fiber optic network. The port tap cable comprises at least one live input fiber optic cable leg having at least one live input optical fiber, and at least one live output fiber optic cable leg having at least one live output optical fiber. The port tap cable further comprises a furcation optically connected in-line between the at least one live input fiber optic cable leg and the at least one live output fiber optic cable leg. The furcation encloses at least one fiber optic splitter, each having a live input optically connected to one of the at least one live input optical fiber, a live output optically connected to one of the at least one live output optical fiber, and a tap output. The port tap cable further comprises at least one tap output fiber optic cable leg having at least one tap output optical fibers optically connected to the furcation. Each of the at least one tap output optical fibers is optically connected to a tap output of one of the at least one fiber optic splitter.

An additional embodiment of the disclosure relates to a port tap cable for supporting a plurality of live optical connections and plurality of tap optical connections in a fiber optic network. The port tap cable comprises at least one live input fiber optic cable leg and a plurality of live input optical fibers disposed in the at least one live input fiber optic cable leg. The port tap cable also comprises a plurality of combined output fiber optic cable legs having at least one live output optical fiber and at least one tap output optical fiber. A furcation is optically connected in-line between the at least one live input fiber optic cable leg and the plurality of combined output fiber optic cable legs. The furcation encloses at least one fiber optic splitter. Each fiber optic splitter has a live input optically connected to one of the at least one live input optical fiber, a live output optically connected to one of the at least one live output optical fiber, and a tap output optically connected to one of the at least one tap output optical fiber.

An additional embodiment of the disclosure relates to a system for supporting at least one live optical connection and at least one tap optical connection in a fiber optic network. The system comprises a first fiber optic component having at least one fiber optic output, a second fiber optic component having at least one fiber optic input, and at least one port tap cable optically connected between the first fiber optic component and the second fiber optic component. The port tap cable comprises at least one live input fiber optic cable leg having at least one live input optical fiber, and at least one live output fiber optic cable leg having at least one live output optical fiber. A furcation is optically connected in-line between the at least one live input fiber optic cable leg and the at least one live output fiber optic cable leg, and encloses at least one fiber optic splitter. Each fiber optic splitter has a live input optically connected to one of the at least one live input optical fiber, a live output optically connected to one of the at least one live output optical fiber, and a tap output. The port tap cable further comprises at least one tap output fiber optic cable leg having at least one tap output optical fiber optically connected to the furcation. Each tap output optical fiber is optically connected to a tap output of one of the at least one fiber optic splitter. In addition, one of the at least one port tap cable is optically connected between the first fiber optic component and the second fiber optic component such that the live input fiber optic cable leg of the port tap cable is optically connected to the at least one fiber optic output of the first fiber optic component, and the live output fiber optic cable leg of the port tap cable is optically connected to the at least one fiber optic input of the second fiber optic component.

An additional embodiment of the disclosure relates to a method of assembling a port tap cable for supporting at least one live optical connection and at least one tap optical connection in a fiber optic network. The method comprises optically connecting at least one live input optical fiber of at least one live input fiber optic cable leg to a live input of at least one optical splitter. The method further comprises optically connecting at least one live output optical fiber of at least one live output fiber optic cable leg to a live output of the at least one optical splitter. The method further comprises optically connecting at least one tap output optical fiber of at least one tap output fiber optic cable leg to a tap output of the at least one optical splitter. The method further comprises enclosing the at least one optical splitter within a furcation such that each of the at least one live input fiber optic cable leg, at least one live output fiber optic cable leg, and the tap output fiber optic cable leg is optically connected to the furcation.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Embodiments include a port tap cable for supporting live optical connections and tap connections in a fiber optic network. One or more fiber optic splitters receive an optical signal from a live input optical fiber of a live input fiber optic cable leg. Each fiber optic splitter splits each optical signal and transmits the signal to a live output optical fiber of a live output fiber optic cable leg and a tap output optical fiber of a tap output fiber optic cable leg. The one or more splitters are enclosed in a furcation, such as a furcation plug, that is disposed in-line with the fiber optic cable legs, thereby forming a port tap cable that allows for monitoring of optical signals within an active fiber optic network without the need for interrupting network operations. This arrangement also allows for monitoring individual ports in an existing network installation.

Figure 1:
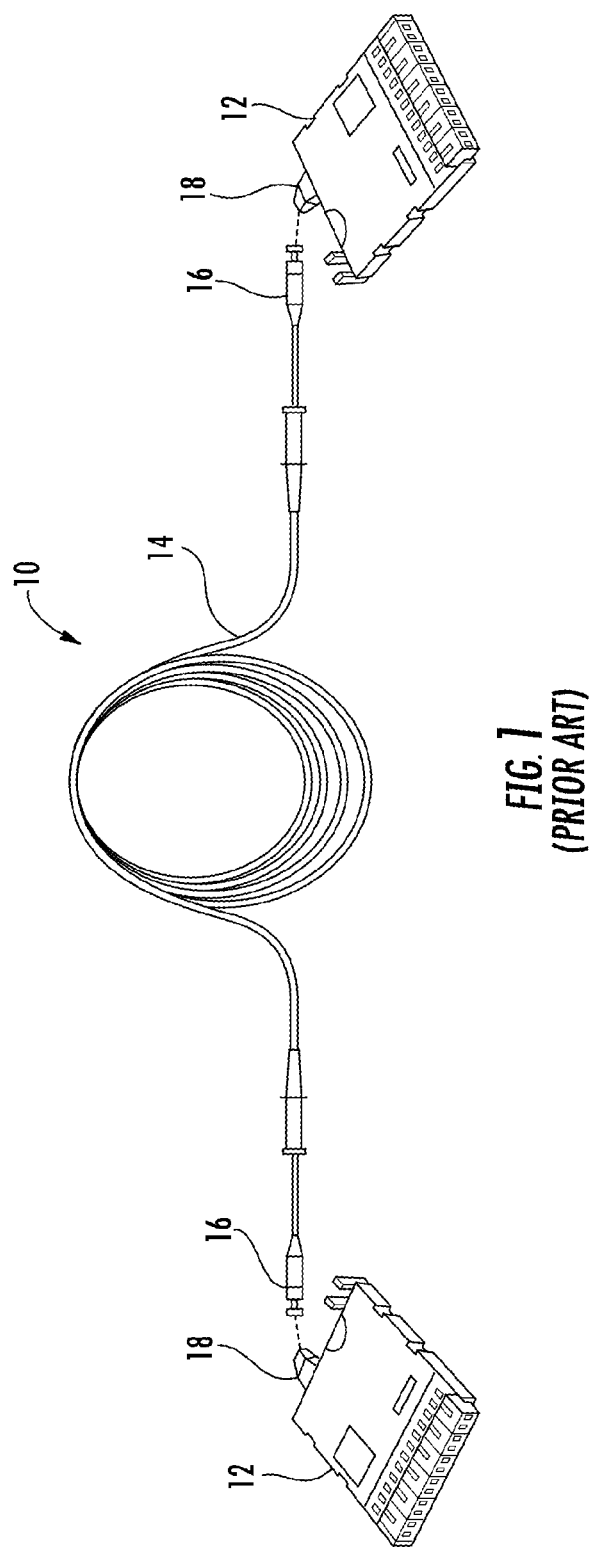
FIG. 1 illustrates a portion of a fiber optic network having a plurality of fiber optic modules interconnected by a fiber optic cable according to the prior art.

Before turning to the embodiments described herein, a portion of a conventional fiber optic network 10 is illustrated in FIG. 1 to illustrate the desirability of providing a port tap cable having an in-line furcation for supporting tap connections, as described herein. FIG. 1 illustrates a simplified view of a portion of a fiber optic network 10 having a plurality of exemplary interconnected fiber optic components, such as fiber optic modules 12, having one or more live fiber optic cables 14 optically connected there between. Each fiber optic cable 14 includes one or more fiber optic connectors 16 on each end, which connect to one or more fiber optic ports 18 on each module 12 or other component. One or more live optical signals is carried by the fiber optic cable 14 between the modules 12 and other components. However, this conventional arrangement does not allow for monitoring live traffic on the network 10 without interrupting network operation.

To address the problem of monitoring live network traffic without interrupting network operation, port tap devices, such as the port tap cables disclosed herein and described in greater detail below, may provide a traffic visibility fabric between high speed network connections and the multiple tools used to analyze the traffic. Using the embodiments described herein, a tap device can scale to thousands of connections and replicate traffic to a smaller set of centralized multi-functional tools consistently reducing capital expenses and operational expenses as installation is scaled up to meet growing demand. The tap device can securely access critical traffic at a fraction of the cost and enhances the visibility of all the traffic, anywhere on the network.

Figure 2:
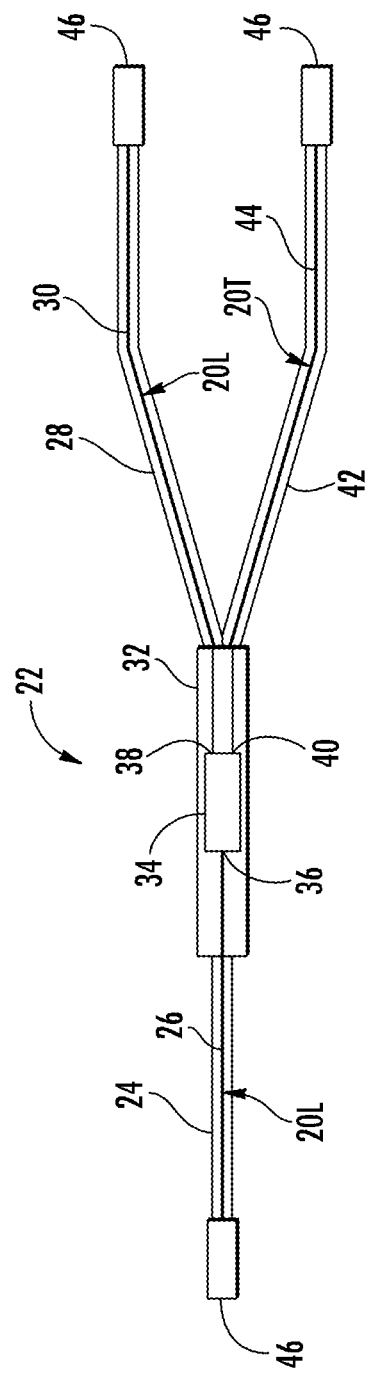
FIG. 2 illustrates a schematic diagram of a port tap cable having an in-line furcation for supporting one live optical connection and one tap optical connection in a fiber optic network according to an exemplary embodiment.

Embodiments disclosed herein thus provide infrastructure architects, managers and operators real time visibility into the traffic traversing both physical and virtual networks without affecting the performance or stability of the production environment. In this regard, FIG. 2 illustrates a respective schematic diagram of a port tap cable 22 for supporting one live optical connection and a tap optical connection in a fiber optic network according to an exemplary embodiment. The port tap cable 22 comprises a live input fiber optic cable leg 24 having one live input optical fiber 26, and a live output fiber optic cable leg 28 having one live output optical fiber 30. A furcation 32 is optically connected in-line between the live input fiber optic cable leg 24 and the live output fiber optic cable leg 28. The furcation 32 encloses a fiber optic splitter 34 having a live input 36, a live output 38, and a tap output 40. The live input 36 is optically connected to the live input optical fiber 26, and the live output 38 is optically connected to the live output optical fiber 30. A tap output fiber optic cable leg 42 having a tap output optical fiber 44 is also optically connected to the furcation 32. The tap output optical fiber 44 of the tap output fiber optic cable leg 42 is optically connected to a tap output 40 of the fiber optic splitter 34. Each of the fiber optic cable legs 24, 28, 42 may also terminate in one or more connectors. In this embodiment, each of the fiber optic cable legs 24, 28, 42 terminates in a simplex connector 46. In a non-limiting example, the simplex connector 46 could be an SC, LC or FC simplex or other connector.

Figure 3:
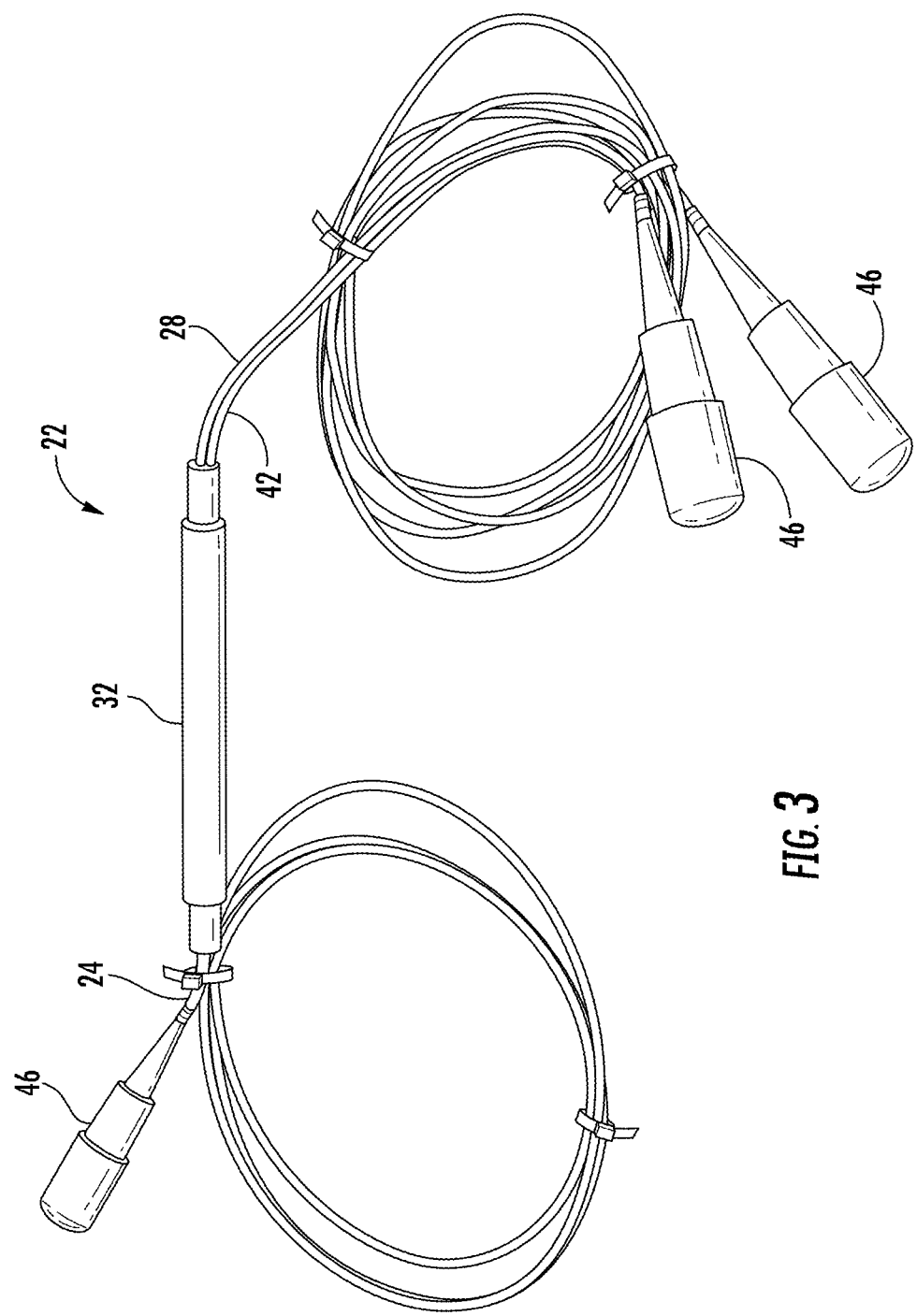
FIG. 3 illustrates a port tap cable according to the embodiment of FIG. 2 having an in-line furcation plug for supporting the one live optical connection and one tap optical connection in a fiber optic network.

FIG. 3 illustrates a port tap cable according to the embodiment of FIG. 2 in which the furcation 32 is an in-line furcation plug. In other embodiments, the furcation 32 may be a shrink wrap or other suitable type of furcation. In this manner, a fiber optic tap component may be optically connected or removed from the tap output fiber optic cable leg without interrupting a live signal being transmitted along the live input and live output fiber optic cable legs 24, 28.

Figure 4:
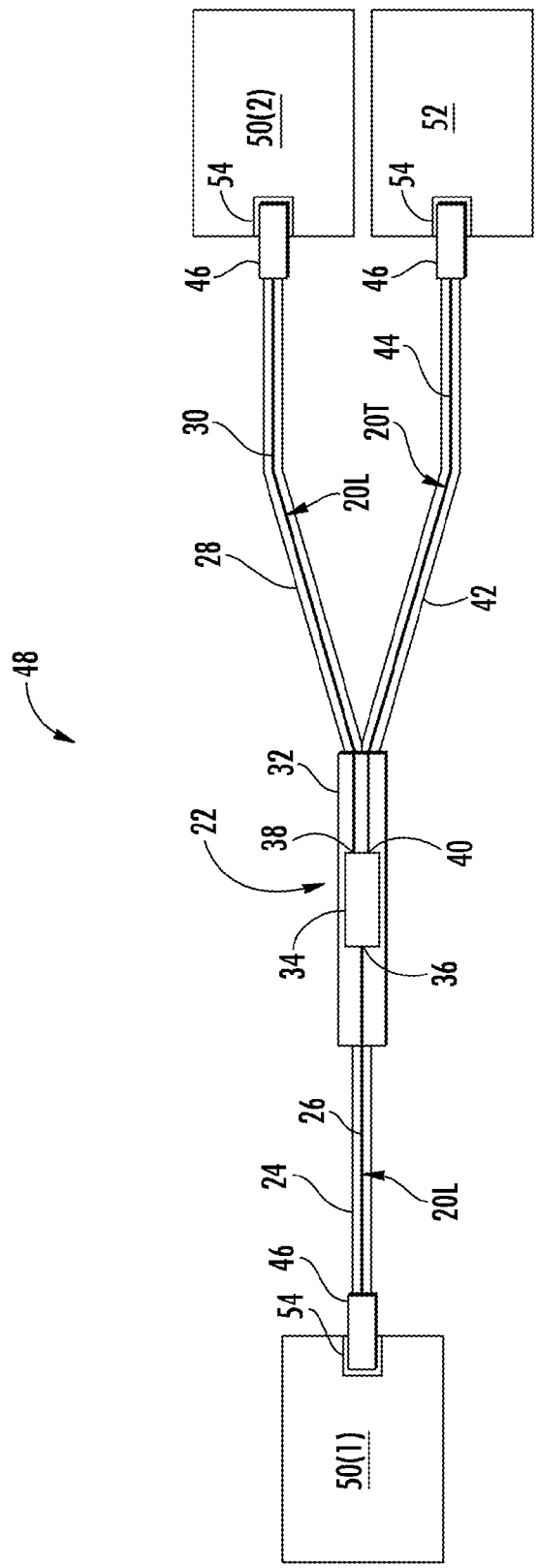
FIG. 4 illustrates a schematic diagram of a portion of a fiber optic network having two live fiber optic modules and one tap module interconnected by a port tap cable of FIG. 2.

The live signal may be provided or received by a variety of different fiber optic components or devices. In this regard, FIG. 4 illustrates a simplified diagram of a portion of a network 48 having a plurality of fiber optic components 50(1) and 50(2), such as fiber optic modules, switches, devices, etc., having one or more port tap cables 22 optically connected there between. In this embodiment, the live input fiber optic cable leg 24 is optically connected to fiber optic component 50(1) and the live output fiber optic cable leg 28 is optically connected to fiber optic component 50(2), thereby permitting fiber optic component 50(1) to transmit a live optical signal 20L from fiber optic component 50(1) to fiber optic component 50(2).

At the same time, another fiber optic component 52, such as a separate fiber optic module, is optically connected to the tap output fiber optic cable leg 42 of port tap cable 22, thereby allowing the fiber optic component 52 to receive a tap optical signal 20T from fiber optic component 50(1). In this example, each simplex connector 46 is optically connected to a complementary simplex fiber optic port 54 on each fiber optic component 50(1), 50(2) and fiber optic component 52. In this and other embodiments, tap optical signal 20T contains the same information as live optical signal 20L. Thus, the content of the live optical signal 20L can be observed and monitored via the tap optical signal 20T received by fiber optic component 52. In this embodiment, the splitter 34 is a 70/30 splitter, and is configured to split the live fiber optic signal 20L having 100% strength received at live input 36 into a live optical signal 20L having 70% strength output from live output 38, and a tap optical signal 20T having 30% strength output from tap output 40. Other signal strength ratios may also be provided. For example, in other embodiments, the differences in signal strength output may be smaller (e.g., 60/40, 50/50), or greater (e.g., 90/10). In this manner, port tap cable 22 and other port tap cables described herein can be integrated into any type of fiber optic network, including point-to-point networks, structured cabling installations, and other types of networks. As will be shown in detail below, a number of other port tap configurations are contemplated, and are applicable to jumper, harness, trunk, and other types of fiber optic cable.

Figure 5:
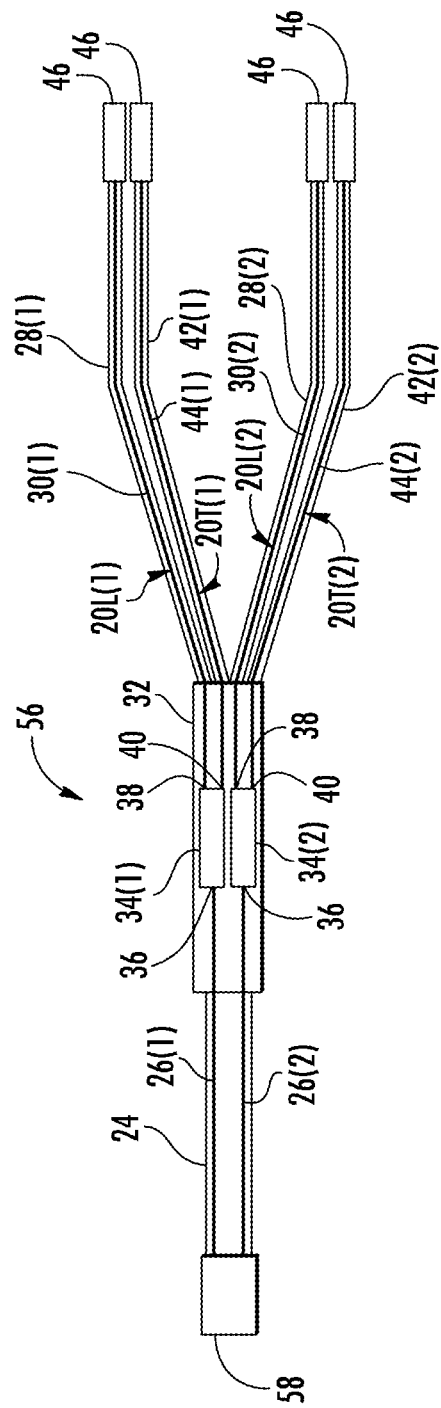
FIG. 5 illustrates a schematic diagram of a port tap cable having an in-line furcation for supporting two live optical connections and two tap optical connections in a fiber optic network according to an exemplary embodiment.

Embodiments that employ multiple live and/or tap connections are also contemplated. In this regard, FIG. 5 illustrates a schematic diagram of a port tap cable 56 for supporting two live optical connections and two tap optical connections in a fiber optic network according to an exemplary embodiment. The port tap cable 56 comprises one live input fiber optic cable leg 24 having two live input optical fibers 26(1) and 26(2), and two live output fiber optic cable legs 28(1) and 28(2), each having a corresponding live output optical fiber 30(1), 30(2). Similar to FIG. 2, a furcation 32 is optically connected in-line between the live input fiber optic cable leg 24 and the live output fiber optic cable legs 28(1), 28(2). The furcation 32 encloses two fiber optic splitters 34(1) and 34(2) each having a live input 36, a live output 38, and a tap output 40. Each live input 36 is optically connected to a corresponding live input optical fiber 26(1), 26(2), and each live output 38 is optically connected to a corresponding live output optical fiber 30(1), 30(2). A pair of tap output fiber optic cable legs 42(1) and 42(2), each having a corresponding tap output optical fiber 44(1) and 44(2), are also optically connected to the furcation 32. Each tap output optical fiber 44(1), 44(2) is optically connected to a tap output 40 of a corresponding fiber optic splitter 34(1), 34(2). As with FIG. 2, each of the fiber optic cable legs 24, 28(1), 28(2), 42(1), 42(2) may also terminate in one or more connectors. In this embodiment, for example, live input fiber optic cable leg 24 terminates in a duplex connector 58, while each live output fiber optic cable leg 28(1), 28(2) and tap output fiber optic cable leg 42(1), 42(2) terminates in a simplex connector 46. In a non-limiting example, the duplex connector 46 could be an SC, LC or FC duplex or other connector. This arrangement permits individual live optical signals 20L(1), 20L(2) to be routed to different locations in a network, and simultaneously permits individual live optical signals 20L(1), 20L(2) corresponding to tap optical signals 20T(1), 20T(2) to be individually monitored at one or more network locations as well.

Figure 6:
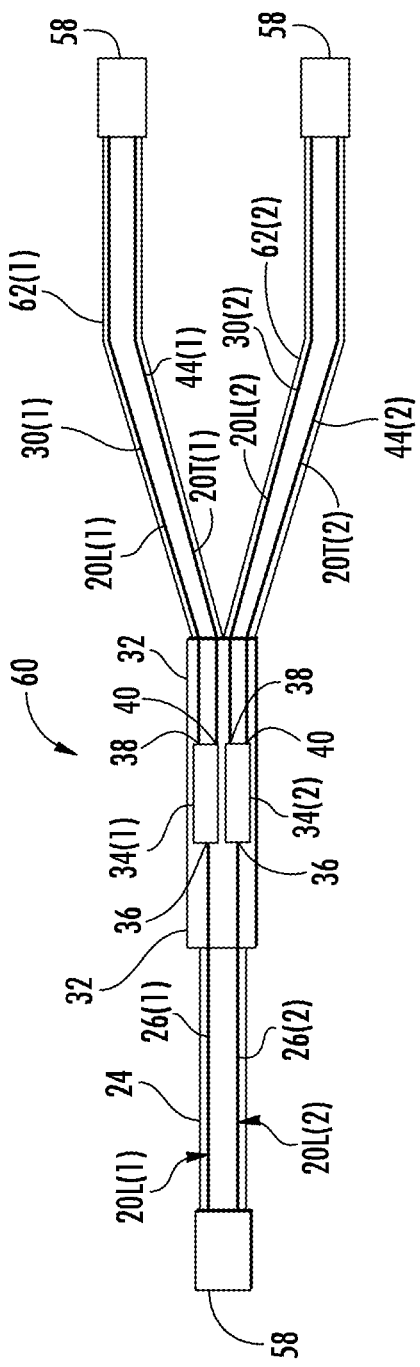
FIG. 6 illustrates a schematic diagram of a port tap cable having an in-line furcation for supporting two live optical connections and two tap optical connections in a pair of combined output fiber optic cable legs in a fiber optic network according to an exemplary embodiment.

In some embodiments, it may be advantageous to combine complementary live and tap optical signals into one or more combined output fiber optic cable legs, for example, to aid in cable management and organization of matched pairs of live and tap connections. In this regard, FIG. 6 illustrates a schematic diagram view of a port tap cable 60 for supporting two live optical connections and two tap optical connections in a pair of combined output fiber optic cable legs 62 according to an exemplary embodiment. The port tap cable 60 comprises one live input fiber optic cable leg 24 having two live input optical fibers 26(1) and 26(2), and two combined output fiber optic cable legs 62(1) and 62(2). Each combined output fiber optic cable leg 62 includes one live output optical fiber 30 and one corresponding tap output optical fiber 44. A furcation 32 is optically connected in-line between the live input fiber optic cable leg 24 and the combined output fiber optic cable legs 62(1), 62(2). Like FIG. 5 above, the furcation 32 encloses two fiber optic splitters 34(1) and 34(2) each having a live input 36, a live output 38, and a tap output 40. Each live input 36 is optically connected to a corresponding one of the live input optical fibers 26(1) or 26(2), each live output 38 is optically connected to a corresponding one of the live output optical fibers 30(1) or 30(2), and each tap output 40 is optically connected to a corresponding one of the tap output optical fibers 44(1) or 44(2). In this embodiment, the live input fiber optic cable leg 24 and each of the combined output fiber optic cable legs 62 terminate in a duplex connector 58. This arrangement permits each combined output fiber optic cable leg 62 to simultaneously output a live optical signal 20L(1) or 20L(2) and a corresponding tap optical signal 20T(1) or 20T(2) to a common fiber optic component using a single connector. One advantage of this arrangement is that it is not necessary to keep track of the location of individual tap connections in relation to their corresponding live connections, because each pair of live and tap output optical fibers 30, 44 is optically connected to a common duplex connector 58.

Figure 7:
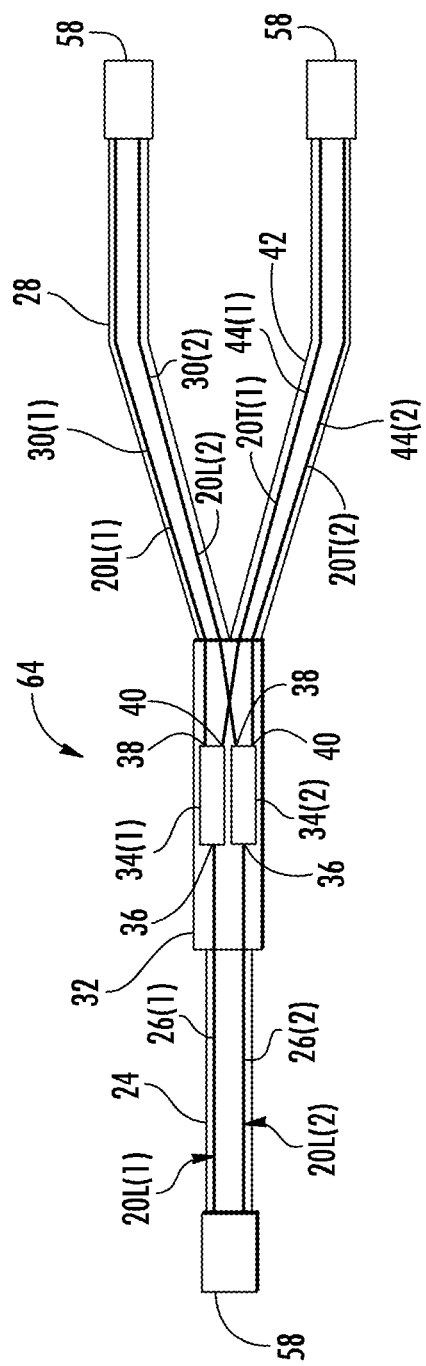
FIG. 7 illustrates a schematic diagram of a port tap cable having an in-line furcation for supporting two live optical connections in a single live output fiber optic cable leg and two tap optical connections in a single tap output optical cable leg in a fiber optic network according to an exemplary embodiment.

It may also be desirable to transmit multiple live optical signals 20L to one fiber optic component port and to transmit the corresponding tap optical signals 20T to another fiber optic component or port, for example, to keep live and tap connections physically separated for management and security applications. In this regard, FIG. 7 illustrates a schematic diagram view of a port tap cable 64 for supporting two live output optical fibers 30(1) and 30(2) in a single live output fiber optic cable leg 28 and two tap output optical fibers 44(1) and 44(2) in a single tap output fiber optic cable leg 42 according to an exemplary embodiment. The port tap cable 64 comprises one live input fiber optic cable leg 24 having two live input optical fibers 26(1) and 26(2), the live output fiber optic cable leg 28 having the two live output optical fibers 30(1) and 30(2), and the tap output fiber optic cable leg 42 having the two tap output optical fibers 44(1) and 44(2). A furcation 32 is optically connected in-line between the live input fiber optic cable leg 24 and both the live output fiber optic cable leg 28 and tap output fiber optic cable leg 42. Like FIGS. 4 and 5 above, the furcation 32 encloses two fiber optic splitters 34(1) and 34(2) each having a live input 36, a live output 38, and a tap output 40. Each live input 36 is optically connected to a corresponding one of the live input optical fibers 26(1) or 26(2), each live output 38 is optically connected to a corresponding one of the live output optical fibers 30(1) or 30(2), and each tap output 40 is optically connected to a corresponding one of the tap output optical fibers 42(1) or 42(2). In this embodiment, the live input fiber optic cable leg 24, live output fiber optic cable leg 28, and the tap output fiber optic cable leg 42 each terminate in a duplex connector 58. This arrangement permits the routing of both live optical signals 20L to one fiber optic device or port, and the routing of both tap optical signals 20T to another fiber optic device or port.

Figure 8:
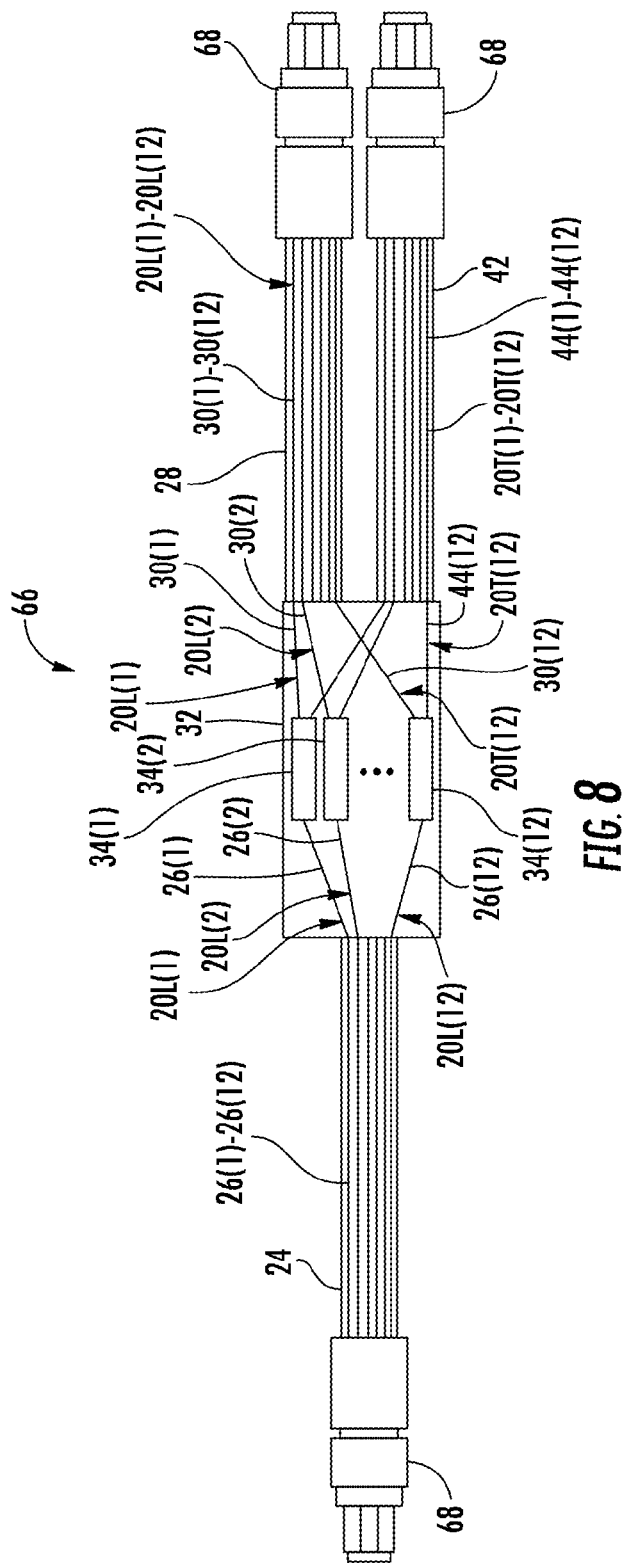
FIG. 8 illustrates a schematic diagram of a port tap cable having an in-line furcation for supporting twelve live optical connections in a single live output fiber optic cable leg and twelve tap optical connections in a single tap output optical cable leg in a fiber optic network according to an exemplary embodiment.

The arrangement of FIG. 7 is not limited to two tap connections. Instead, any number of combinations of legs, fibers, connectors and live or tap connections may be employed. In this regard, FIG. 8 illustrates a schematic diagram view of a port tap cable 66 for supporting twelve live output optical fibers 30 in a single live output fiber optic cable leg 28 and twelve tap output optical fibers 44 in a single tap output fiber optic cable leg 42 according to an exemplary embodiment. The port tap cable 66 comprises one live input fiber optic cable leg 24 having twelve live input optical fibers 26(1)-26(12), one live output fiber optic cable leg 28 having twelve live output optical fibers 30(1)-30(12), and one tap output fiber optic cable leg 42 having twelve tap output optical fibers 44(1)-44(12). A furcation 32 encloses twelve fiber optic splitters 34(1)-34(12) each having a live input 36, a live output 38, and a tap output 40 (not labeled to simplify), and each optically connected in a manner similar to the arrangement of FIG. 7, described above. In this embodiment, the live input fiber optic cable leg 24, live output fiber optic cable leg 28, and the tap output fiber optic cable leg 42 each terminate in a multi-fiber connector 68. This arrangement permits the routing of a larger number of live optical signals 20L to one fiber optic device or port, and the routing of the corresponding larger number of tap optical signals 20T to another fiber optic device or port.

Figure 9:
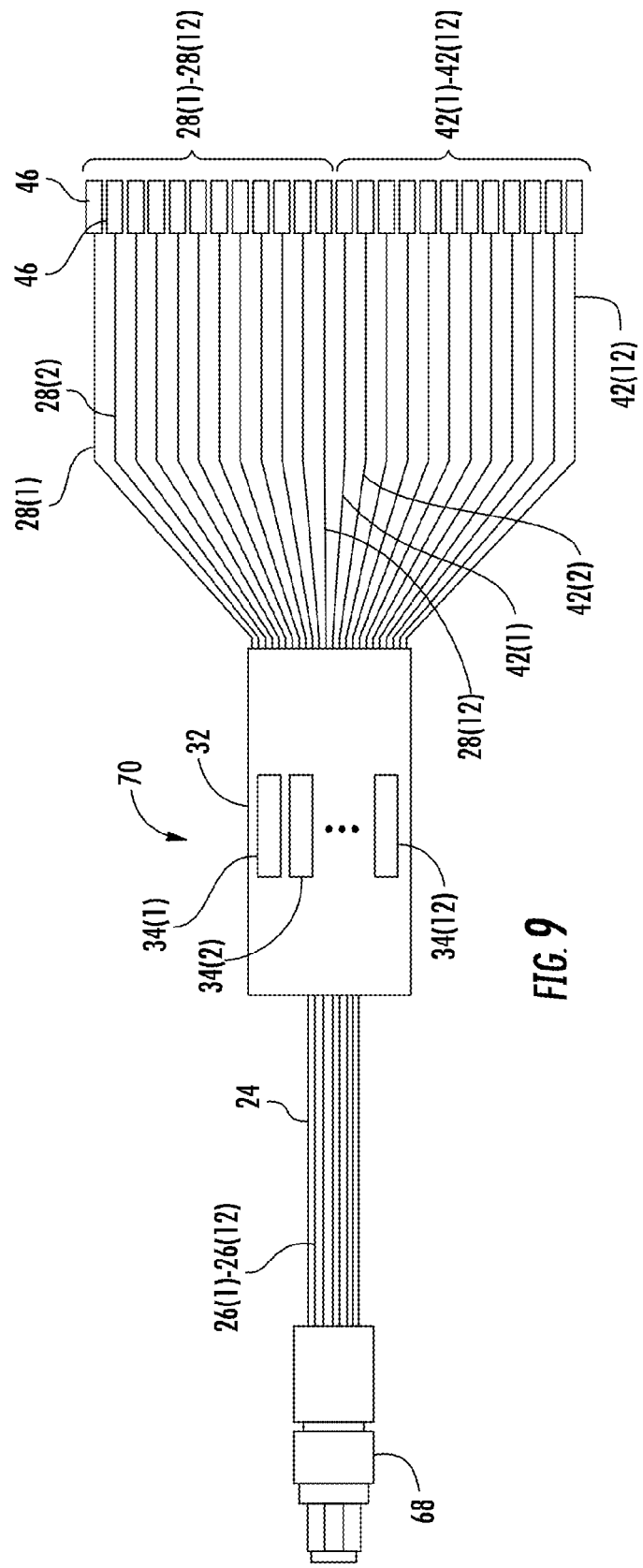
FIG. 9 illustrates a schematic diagram of a port tap cable having an in-line furcation for supporting twelve live optical connections in twelve individual live output fiber optic cable legs and twelve tap optical connections in twelve individual tap output fiber optic cable legs in a fiber optic network according to an exemplary embodiment.

Other embodiments may include one fiber optic cable leg having a multi-fiber connector at one of an input and an output, and a plurality of individual fiber optic cable legs each having a simplex or duplex connector at the other of the input and the output. One advantage of this arrangement is that live signals can be centrally managed via the multi-fiber connector while being distributed to and received from a plurality of live and tap devices. In this regard, FIG. 9 illustrates a schematic diagram view of a port tap cable 70 for supporting twelve live output optical fibers 30 (not shown) in twelve individual live output fiber optic cable legs 28(1)-28(12) and twelve tap output optical fibers 44 (not shown) in twelve individual tap output fiber optic cable legs 42(1)-42(12) according to an exemplary embodiment. The port tap cable 70 comprises one live input fiber optic cable leg 24 having twelve live input optical fibers 26(1)-26(12) optically connected to a furcation 32 that encloses twelve fiber optic splitters 34(1)-34(12) each having a live input 36, a live output 38, and a tap output 40 (not shown to simplify), and each optically connected in a manner similar to the arrangements described above with respect to FIGS. 6 and 7. In this embodiment, the live input fiber optic cable leg 24 terminates in a multi-fiber connector 68, while each live output fiber optic cable leg 28 and each tap output fiber optic cable leg 42 terminates in a simplex connector 46. In a non-limiting example, the multi-fiber connector 46 could be an MPO, MTP or other connector.

Figure 10:
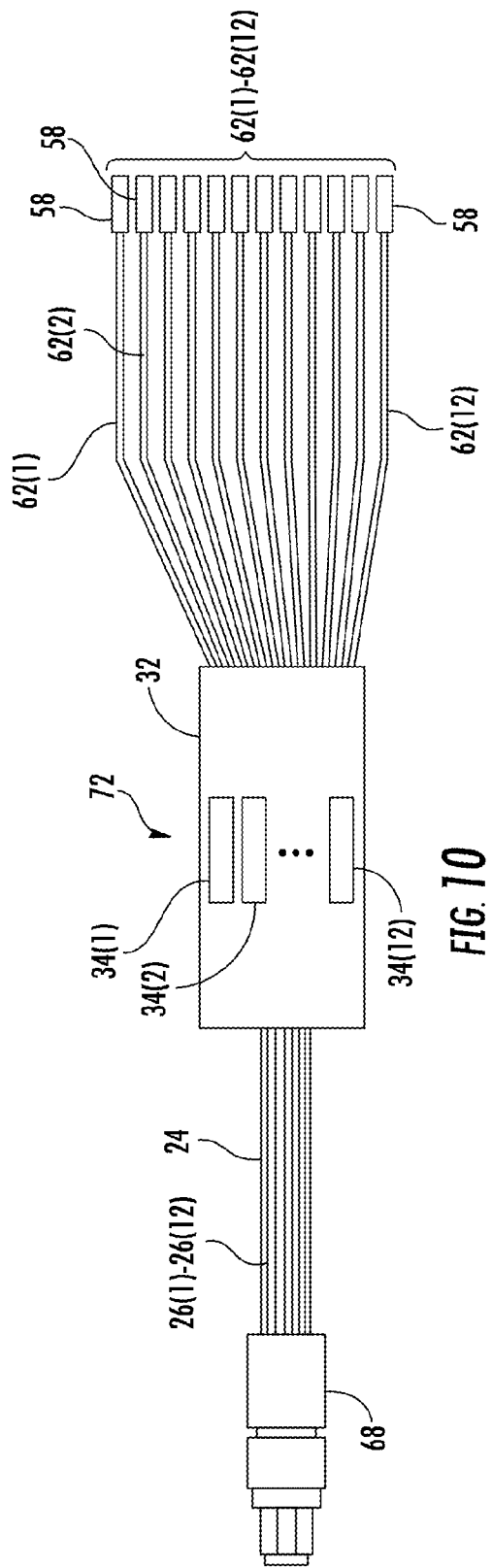
FIG. 10 illustrates a schematic diagram of a port tap cable having an in-line furcation for supporting twelve live optical connections and twelve tap optical connections in twelve combined output fiber optic cable legs in a fiber optic network according to an exemplary embodiment.

In an alternative arrangement having advantages similar to the embodiment of FIG. 6, FIG. 10 illustrates a schematic diagram view of a port tap cable 72 for supporting twelve live output optical fibers 30 (not shown) and twelve corresponding tap output optical fibers 44 (not shown) in twelve combined output fiber optic cable legs 62(1)-62(12) according to an exemplary embodiment. Like the port tap cable 70 of FIG. 9, the port tap cable 72 of FIG. 10 comprises one live input fiber optic cable leg 24 having twelve live input optical fibers 26(1)-26(12) optically connected to a furcation 32 that encloses twelve fiber optic splitters 34(1)-34(12) each having a live input 36, a live output 38, and a tap output 40 (not shown to simplify), and each optically connected in a manner similar to the arrangements described above with respect to FIGS. 7 and 8. In this embodiment, the live input fiber optic cable leg 24 terminates in a multi-fiber connector 68, while each combined output fiber optic cable leg 62 terminates in a duplex connector 58.

The above embodiments can be used in a number of different applications, including system monitoring, security and other applications where it is desirable to observe live network traffic on a fiber optic network without interrupting or interfering with network operation. In addition, the above embodiments can be integrated into an existing system without requiring the installation of a separate and expensive standalone port tap solution.

In addition, the lengths of the various input and output legs of the above embodiments are easily configurable to accommodate routing of different legs to different components, including optical switches and devices. This permits the physical separation of live ports and tap ports into separate cabinets, installations, or locations in some embodiments. One advantage of this arrangement is that, by physically separating live and tap ports, an IT team can be granted physical access to one area of the network containing live ports, and security and/or compliance can be granted physical access to another area of the network containing tap ports.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A port tap cable for supporting at least one live optical connection and at least one tap optical connection in a fiber optic network, comprising:
    at least one live input fiber optic cable leg having at least one live input optical fiber;
    at least one live output fiber optic cable leg having at least one live output optical fiber;
    a furcation connected in-line between the at least one live input fiber optic cable leg and the at least one live output fiber optic cable leg, and enclosing at least one fiber optic splitter, wherein each fiber optic splitter has a live input optically connected to one of the at least one live input optical fiber, a live output optically connected to one of the at least one live output optical fiber, and a tap output; and
    at least one tap output fiber optic cable leg having at least one tap output optical fibers optically connected to the furcation, wherein each of the at least one tap output optical fibers is optically connected to a tap output of one of the at least one fiber optic splitter.

2. The port tap cable of claim 1, further comprising at least one input fiber optic connector terminating each of the at least one live input fiber optic cable leg, at least one output fiber optic connector terminating each of the at least one live output fiber optic cable leg, and at least one tap fiber optic connector terminating each of the at least one tap output fiber optic cable leg.

3. The port tap cable of claim 2, wherein each of the at least one input fiber optic connector, at least one output fiber optic connector and at least one tap fiber optic connector is a simplex connector.

4. The port tap cable of claim 3, wherein each of the at least one input fiber optic connector, at least one output fiber optic connector and at least one tap fiber optic connector is selected from a group consisting of an SC connector, an LC connector, and an FC connector.

5. The port tap cable of claim 2, wherein each of the at least one input fiber optic connector, at least one output fiber optic connector and at least one tap fiber optic connector is a duplex connector.

6. The port tap cable of claim 5, wherein each of the at least one input fiber optic connector, at least one output fiber optic connector and at least one tap fiber optic connector is selected from a group consisting of an SC connector and an LC connector.

7. The port tap cable of claim 2, wherein each of the at least one input fiber optic connector, at least one output fiber optic connector and at least one tap fiber optic connector is a multi-fiber connector.

8. The port tap cable of claim 7, wherein each of the at least one input fiber optic connector, at least one output fiber optic connector and at least one tap fiber optic connector is selected from a group consisting of an MPO connector and an MTP connector.

9. The port tap cable of claim 1, wherein each live input fiber optic cable leg terminates in a multifiber fiber optic connector, and each live output fiber optic cable leg and at least one tap output fiber optic cable leg terminates in one of simplex and a duplex connector.

10. The port tap cable of claim 1, wherein the at least one live input optical fiber comprises a plurality of live input optical fibers, the at least one live output optical fiber comprises a plurality of live output optical fibers, and the at least one tap output optical fiber comprises a plurality of tap output optical fibers.

11. The port tap cable of claim 10, wherein the plurality of live input optical fibers comprises twelve live input optical fibers, the plurality of live output optical fibers comprises twelve live output optical fibers, and the plurality of tap output optical fibers comprises twelve tap output optical fibers.

12. The port tap cable of claim 11, further comprising a multi-fiber input fiber optic connector terminating each live input fiber optic cable leg, a multi-fiber output fiber optic connector terminating each live output fiber optic cable leg, and a multi-fiber tap fiber optic connector terminating each tap output fiber optic cable leg.

13. The port tap cable of claim 12, wherein each of the at least one multi-fiber input fiber optic connector, at least one multi-fiber output fiber optic connector and at least one multi-fiber tap fiber optic connector is selected from a group consisting of an MPO connector and an MTP connector.

14. A port tap cable for supporting a plurality of live optical connections and plurality of tap optical connections in a fiber optic network, comprising:
    at least one live input fiber optic cable leg;
    a plurality of live input optical fibers disposed in the at least one live input fiber optic cable leg;
    a plurality of combined output fiber optic cable legs having at least one live output optical fiber and at least one tap output optical fiber; and
    a furcation connected in-line between the at least one live input fiber optic cable leg and the plurality of combined output fiber optic cable legs, and enclosing at least one fiber optic splitter, wherein each fiber optic splitter has a live input optically connected to one of the at least one live input optical fiber, a live output optically connected to one of the at least one live output optical fiber, and a tap output optically connected to one of the at least one tap output optical fiber.

15. A system for supporting at least one live optical connection and at least one tap optical connection in a fiber optic network comprising:
- a first fiber optic component having at least one fiber optic output;
- a second fiber optic component having at least one fiber optic input;
- at least one port tap cable optically connected between the first fiber optic component and the second fiber optic component, comprising:
  - at least one live input fiber optic cable leg having at least one live input optical fiber;
  - at least one live output fiber optic cable leg having at least one live output optical fiber;
  - a furcation connected in-line between the at least one live input fiber optic cable leg and the at least one live output fiber optic cable leg, and enclosing at least one fiber optic splitter, wherein each fiber optic splitter has a live input optically connected to one of the at least one live input optical fiber, a live output optically connected to one of the at least one live output optical fiber, and a tap output; and
  - at least one tap output fiber optic cable leg having at least one tap output optical fiber optically connected to the furcation, wherein each tap output optical fiber is optically connected to a tap output of one of the at least one fiber optic splitter;
- wherein one of the at least one port tap cable is optically connected between the first fiber optic component and the second fiber optic component such that the live input fiber optic cable leg of the port tap cable is optically connected to the at least one fiber optic output of the first fiber optic component, and the live output fiber optic cable leg of the port tap cable is optically connected to the at least one fiber optic input of the second fiber optic component.

16. The fiber optic network system of claim 15, further comprising a third fiber optic component having at least one input optically connected to the tap output fiber optic cable leg of the port tap cable.

17. The fiber optic network system of claim 15, wherein the first fiber optic component has at least one fiber optic input optically connected to at least one live output leg of one of the at least one port tap cable, and the second fiber optic component has at least one fiber optic output optically connected to at least one live input leg of one of the at least one port tap cable.

18. The fiber optic network system of claim 17, further comprising a third fiber optic component having at least one input optically connected to the each of the at least one tap output fiber optic cable leg of the at least one port tap cable.

19. The fiber optic network system of claim 15, wherein each of the at least one fiber optic output comprises at least one output fiber optic port, each of the at least one fiber optic input comprises at least one input fiber optic port, and each of the at least one fiber optic output comprises at least one tap fiber optic port.

20. The port tap cable of claim 19, further comprising at least one input fiber optic connector terminating each of the at least one live input fiber optic cable leg of the at least one port tap cable, at least one output fiber optic connector terminating each of the at least one live output fiber optic cable leg of the at least one port tap cable, and at least one tap fiber optic connector terminating each of the at least one tap output fiber optic cable leg of the at least one port tap cable.

21. The port tap cable of claim 15, further comprising at least one input fiber optic connector terminating each live input fiber optic cable leg of the at least one port tap cable, at least one output fiber optic connector terminating each of the at least one live output fiber optic cable leg of the at least one port tap cable, and at least one tap fiber optic connector terminating each of the at least one tap output fiber optic cable leg of the at least one port tap cable.

22. A method of assembling a port tap cable for supporting at least one live optical connection and at least one tap optical connection in a fiber optic network, comprising:
- optically connecting at least one live input optical fiber of at least one live input fiber optic cable leg to a live input of at least one optical splitter;
- optically connecting at least one live output optical fiber of at least one live output fiber optic cable leg to a live output of the at least one optical splitter;
- optically connecting at least one tap output optical fiber of at least one tap output fiber optic cable leg to a tap output of the at least one optical splitter; and
- enclosing the at least one optical splitter within a furcation such that each of the at least one live input fiber optic cable leg, at least one live output fiber optic cable leg, and the tap output fiber optic cable leg is connected to the furcation.

23. The port tap cable of claim 1, wherein the furcation comprises an in-line furcation plug or a shrink wrap.

* * * * *